United States Patent [19]

Bialobrzeski

[11] 3,846,932
[45] Nov. 12, 1974

[54] VEHICLE MOUNTED INSECT EXTERMINATOR

[76] Inventor: Walter Bialobrzeski, 92 Grove St., East Berlin, Conn. 06023

[22] Filed: May 15, 1972

[21] Appl. No.: 253,457

Related U.S. Application Data

[63] Continuation-in-part of Ser. No. 214,328, Dec. 30, 1971, abandoned.

[52] U.S. Cl. .................................................. 43/138
[51] Int. Cl. ............................................. A01m 5/04
[58] Field of Search ............ 43/138, 112, 107, 111, 43/122, 138, 144; 56/505

[56] References Cited
UNITED STATES PATENTS

| 1,133,039 | 3/1915 | Kochevar | 43/138 |
| 1,325,475 | 12/1919 | Kemp | 43/138 |
| 1,530,681 | 3/1925 | Long | 43/138 |
| 1,624,240 | 4/1927 | Harwood et al. | 43/138 |
| 2,029,225 | 1/1936 | Ekre | 43/138 |
| 3,035,393 | 5/1962 | Mathews | 56/505 |

Primary Examiner—Louis G. Mancene
Attorney, Agent, or Firm—DeLio and Montgomery

[57] ABSTRACT

An insect exterminating device adapted to be moved over foliage, crops or grass and capture rising insects, which comprises an open bottom hood-like member having an apparent escape window together with a device which exterminates insects as they attempt to escape through the window.

13 Claims, 12 Drawing Figures

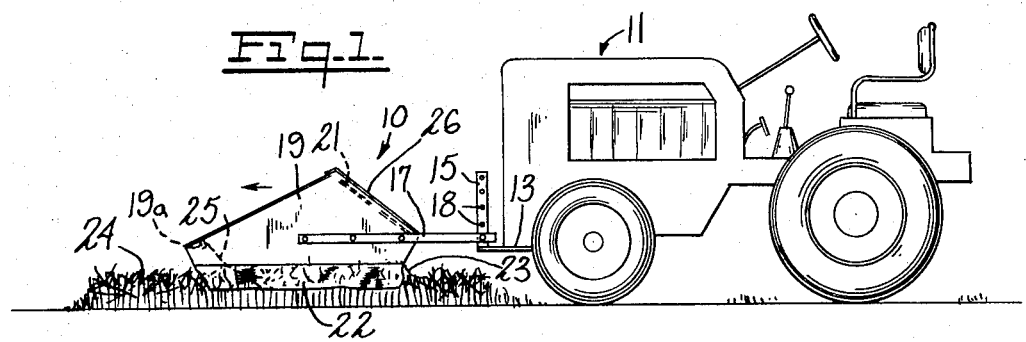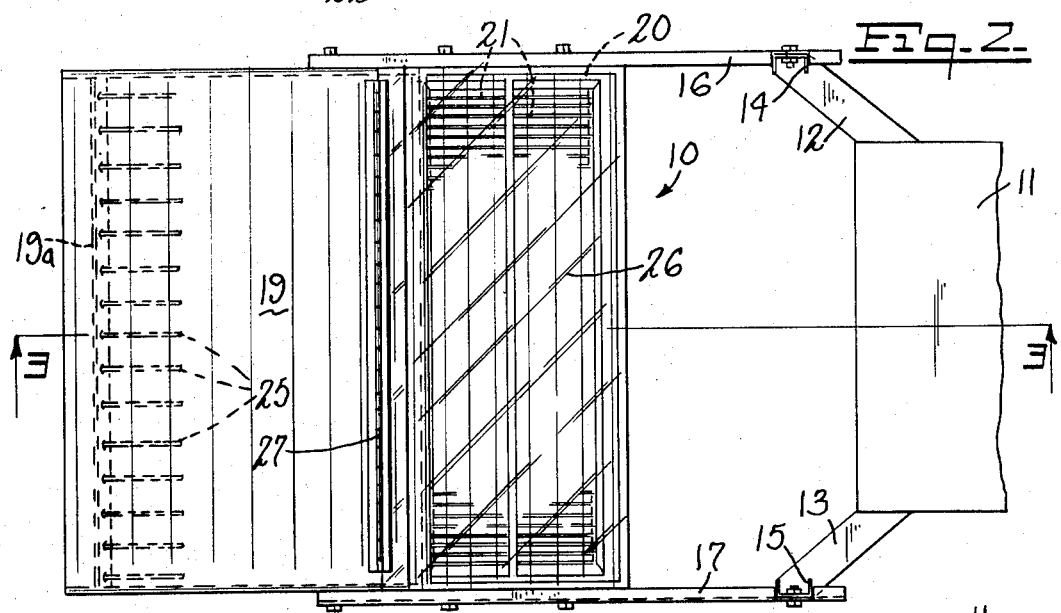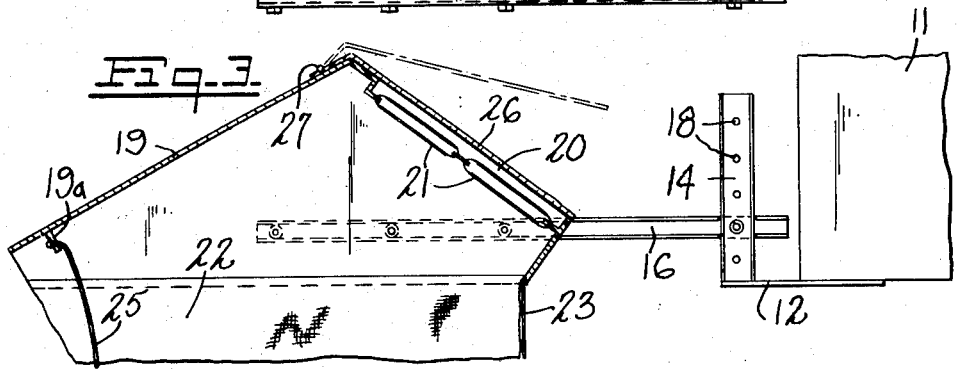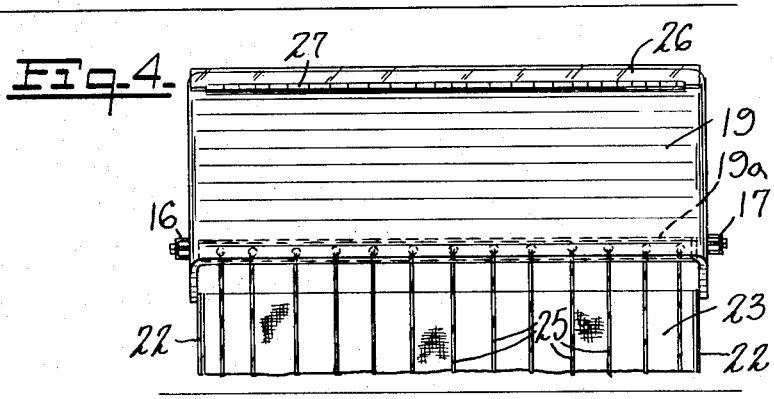

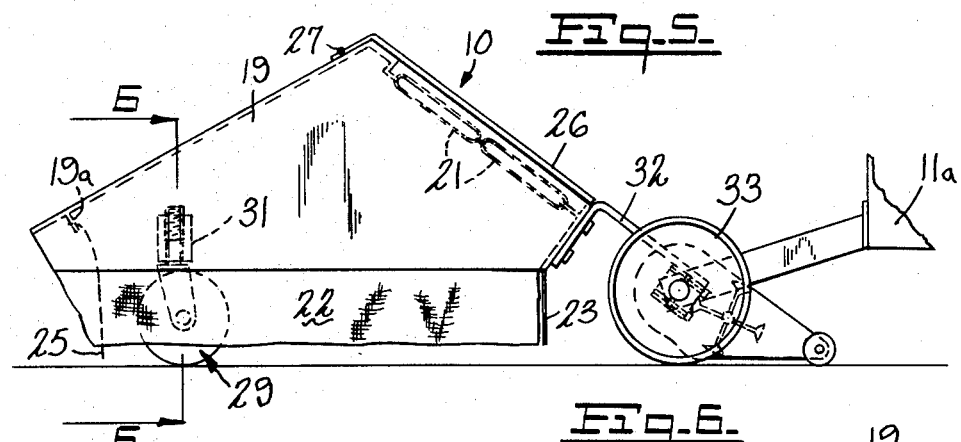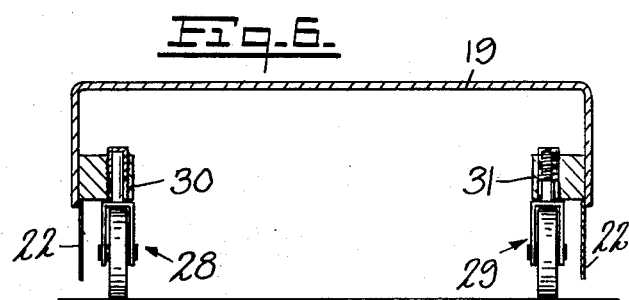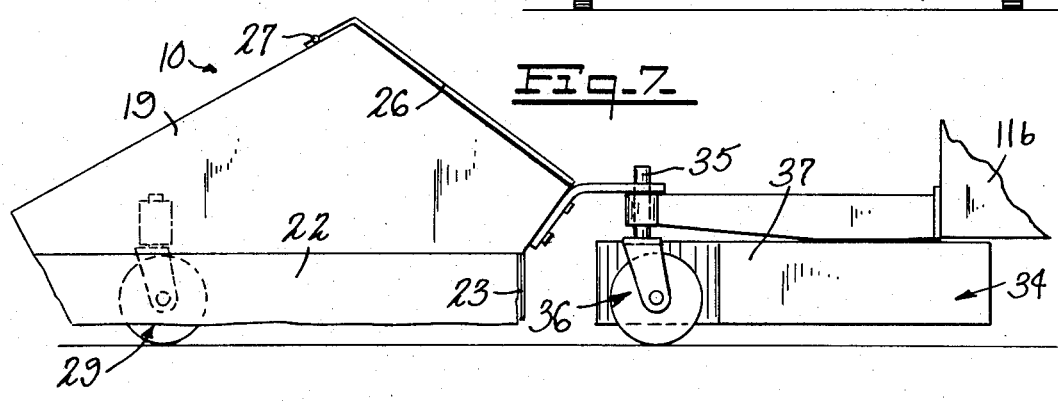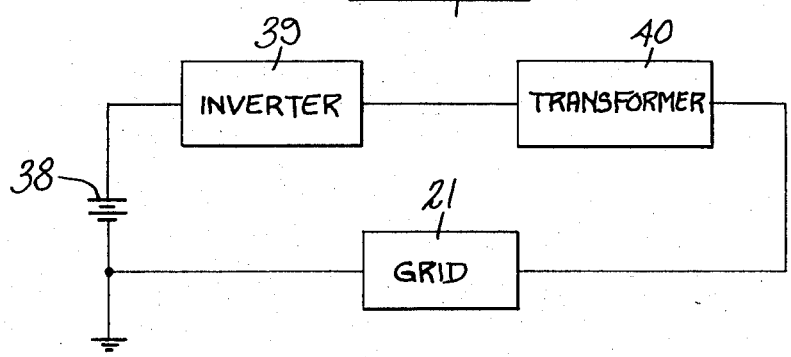

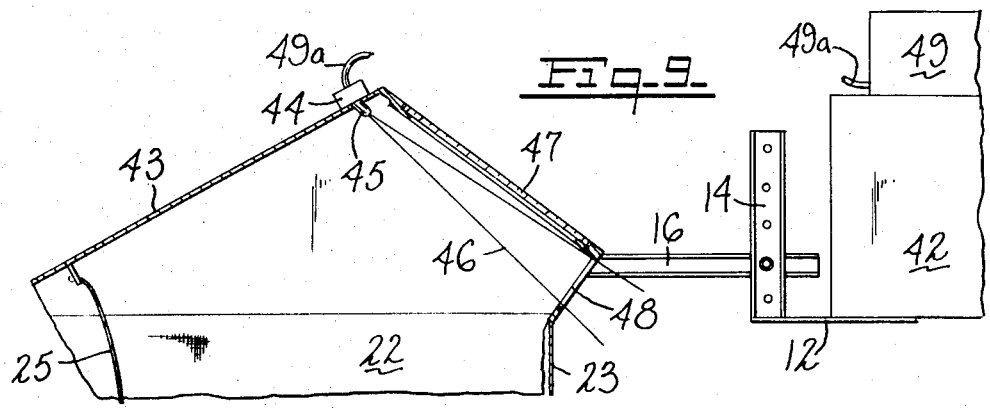
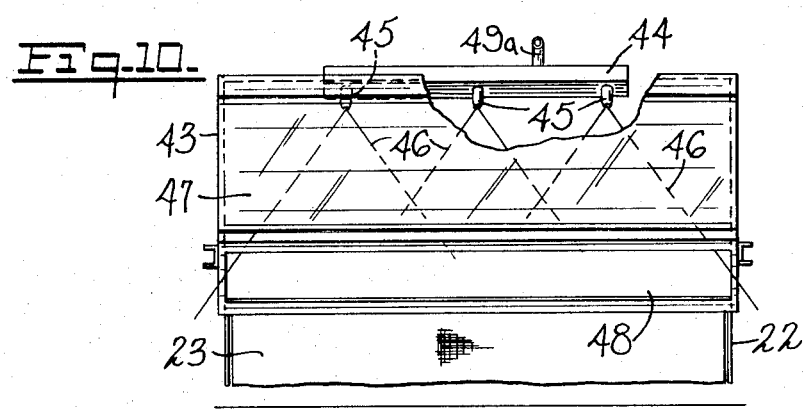
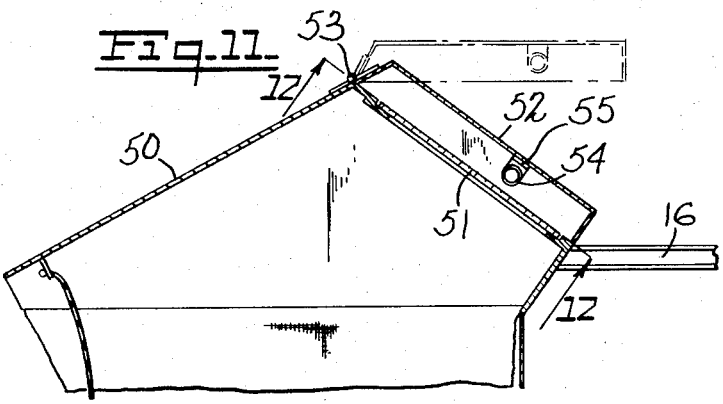
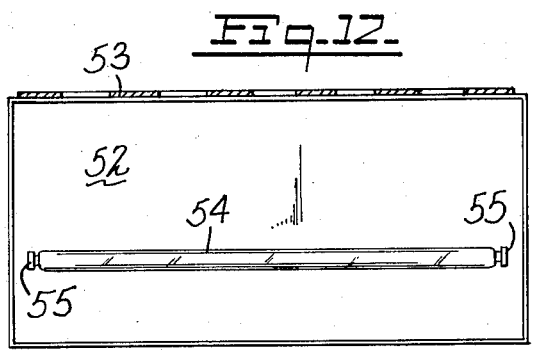

VEHICLE MOUNTED INSECT EXTERMINATOR

This application is a continuation-in-part of copending application Ser. No. 214,328 filed Dec. 30, 1971 and now abandoned.

This invention relates to devices for exterminating ground and flying insects.

Many various types of vehicle-propelled insect exterminating devices have previously been proposed for eliminating flying field and ground feeding insects. Such devices are generally vehicle-mounted. The devices disclosed by the prior art generally suggest the use of a suction device to draw insects from plants or an open electrical grid which is adapted to be contacted by insects as they are disturbed and rise. These prior art devices contain no efficient way of capturing the insects and containing them in a small area as the vehicle mounting the suction device or grid passes over the ground and the insects rise from the ground. Therefore, the majority of the insects escape the grid. Moreover, in the case of the suction devices, only insects remaining on a plant or crop can be captured. Additionally, these suction devices may damage the crops.

The present invention provides a ground insect exterminator which is adapted to be vehicle-mounted or propelled on its own wheels by a vehicle and which captures insects in an open bottom hood-like housing. The hood is generally opaque except for a window which will show light to the insects. However, disposed across this window is an exterminating means which insects must pass through to the window. Thus, all insects which are agitated and rise from the ground as the device passes thereover, will be captured in the hood and must pass through the exterminating means to attempt to escape. The exterminating means may comprise a high voltage electric grid or a substantially flat spray of insecticide parallel to the window.

An object of this invention is to provide a new and improved ground nesting and flying insect exterminating device.

Another object of this invention is to provide a new and improved field insect exterminating means and housing therefor adapted to be moved by a vehicle.

A still further object of this invention is to provide a type of device described having new and improved means for capturing insects as they rise from the ground upon agitation or disturbance and which attracts such insects to attempt to escape through an apparent window.

The features of the invention which are believed to be novel are particularly pointed out and distinctly claimed in the concluding portion of this specification. However, the invention both as to its operation and organization, together with further objects and advantages thereof, may best be appreciated by reference to the following detailed description taken in conjunction with the drawings, in which:

FIG. 1 is a side elevation of a device embodying the invention attached to a vehicle;

FIG. 2 is an enlarged top plan view of the device of FIG. 1;

FIG. 3 is a section in elevation seen in the plane of lines 3—3 of FIG. 2;

FIG. 4 is a front view seen from the left of the device of FIG. 3;

FIG. 5 is a side elevation of an alternate embodiment of the invention shown in combination with a reel type mower propelled by a vehicle;

FIG. 6 is a sectional view seen in the plane of lines 6—6 of FIG. 5;

FIG. 7 is a side elevation of a device embodying the invention shown attached to a rotary type mower which is in turn carried on a vehicle;

FIG. 8 is a block diagram of an electrical network used in conjunction with the invention.

FIG. 9 is a side elevation in half section of another embodiment of the invention;

FIG. 10 is a rear elevation, partly cut away of the apparatus of FIG. 9;

FIG. 11 is a side elevation in half section of another embodiment of the invention; and FIG. 12 is a view seen in the plane of lines 12—12 of FIG. 11.

A device 10 embodying the invention in one form thereof as shown in FIGS. 1 - 4 is adapted to be mounted to a vehicle shown as a wheeled tractor 11. The vehicle 10 carries mounting members 12 and 13 at the sides thereof which include upright brackets 14 and 15, respectively.

Arms 16 and 17 extending from device 10 are adapted to be mounted to the upright members 14 and 15, respectively, with a plurality of heights as by means of the plurality of bolt holes 18 defined in upright members 14 and 15.

The structure described is merely to show the vertically adjustable nature of the device 10. In practice, other supporting brackets or struts may also be utilized if deemed necessary.

The device 10 comprises a hood or shroud 19 defining an enclosure open at the bottom. The hood is opaque except for a window or opening represented by the reference numeral 20 in FIG. 3. The window 20 is preferably disposed toward the back of hood 19 with respect to the direction of motion thereof. Disposed in front of window or opening 20, which is of generally rectangular configuration, is an insect exterminating device in the form of one or more high-voltage electrical grids 21. Depending from hood member 19 on the sides and back thereof is a flexible curtain or side curtain-like members 22 and a back curtain member 23. The curtain-like members extend the depth of enclosure of hood-like member 19 when the unit is adjusted upwardly in height, and further offer little resitance to movement of the device when disposed below the top level 24 (FIG. 1) of the ground growth. The curtain-like members may be made adjustable in vertical dimension or of different dimensions to suit the height of various farm crops. The bottom of the curtain-like members is preferably as close to the ground as possible to capture all rising insects. The device is adaptable for crops such as sugar beets, potatoes, soy beans, etc., which are cultivated by a tractor. Generally, the bottom of the curtain-like members is maintained eight inches from the ground to accommodate any crowns or small ridges in the terrain. The curtain-like members may be attached as by snaps in different sizes, or may have a plurality of rows of snaps to vary the height.

Disposed adjacent the open front end of device 10 is a support member 19a from which depend insect disturbance devices such as a plurality of ropes, cables or cords 25 adapted to drag or move through crops, foliage or growth 24 and provide a disturbance or agitation to cause the nesting or feeding insects to rise. As the insects rise and attempt to fly, the device 10 will be moving in a direction as exemplified by the arrow in FIG. 1 to cause relative movement between the hood 19 and the insects therein.

When once captured in the hood, the insects will see only the light through window 20 and will attempt to escape therethrough, but in so doing they must pass through the high voltage grids 21, and very few, if any, will escape electrocution. The grids are preferably of the type described in copending application Ser. No. 157,845 filed June 29, 1971.

Preferably a transparent cover 26 is hinged to hood 19 as indicated by the piano-type hinge 27. This is for the primary purpose of preventing any extraneous matter from falling across the grids, such as grass clippings, etc. The covering 26 may be of any substantially rigid material such as acrylic, glass, etc.

Another embodiment of the invention is shown in FIG. 5 and comprises the same hood and attendant equipment as previously described which bear common reference numerals. The device of FIGS. 5 and 6 is partially self-supporting on pivotal wheel assemblies 28 and 29 mounted in support members 30 and 31, respectively, on the inside of hood 19 toward the front thereof. The other end of hood 18 is supported on a pair of brackets 32 which are mounted to the tie bar of a reel type mower 33. Mower 33 is also mounted to a vehicle 11a which may be of the type previously illustrated.

The wheel assemblies 28 and 29 may be adjustably mounted in the supports 30 and 31, respectively, as by means of threaded members extending down into the supports and predetermining the dimension between the top of assemblies 28 and 29 and the hood.

The brackets 31 may also be made in various sizes to accommodate different heights.

FIG. 7 exemplifies a further embodiment of the invention where it is attached to a rotary-type mower 34 carried on the front of a vehicle 11b which may also be of the wheeled tractor type. In this case, the rear end of hood 19 may be supported on the shafts 35 of the wheel assemblies 36 supporting the shroud 37 of the mower.

The grids are supplied high voltage electrical power by means of a battery 38, inverter 39 and transformer 40. The inverter 39 and transformer 40 may be packaged for mounting on the device 10 and connected to the battery of the propelling vehicle. Alternatively, the inverter and transformer may be mounted to the propelling vehicle and leads taken therefrom to the grids 21. Where the tractor incorporates an alternator, the inverter is not required. The voltage applied to the grids is generally on the order of five thousand volts and very minute current.

FIG. 9 illustrates another form of the invention wherein a utility vehicle such as a tractor 42 carries a hoood 43 of the general construction previously described. In this embodiment the hood 43 is provided with a manifold 44 having a plurality of nozzles 45 of a type adapted to emit a substantially flat spray screen indicated by the reference numeral 46. The nozzles 45 are so directed that the spray moves across and substantially parallel to a transparent window 47, and exits through an opening 48 in the rear of the hood.

The hood 43 may have agitators 25 and side curtains 23 as previously described. The hood 43 is also vertically adjustable on the propelling vehicle 42.

It is a rather common arrangement to have a tractor or other farm vehicle equipped with insecticide tanks as exemplified by tank 49. A flexible conduit 50 leads from tank 49 to manifold 44. Such farm vehicles are further equipped with the necessary compressors and pumps for ejecting the insecticide under pressure. The nozzles 45 and manifold 44 may be so arranged as to provide a complete spray of the insecticide 46 across window 47. Thus, as the insects rise towards the light in an attempt to escape from the hood they will be subjected to the insecticide spray 46.

In many cases, spraying of crops is carried on in the evening hours, and the invention is further adaptable to use at such time.

FIG. 11 illustrates a hood 50 of the same general construction previously described and having a window 51. In this embodiment of the invention a removable cover 52 may be hinged at 53 to cover window 51. Carried within cover 52 is a light source exemplified as a fluorescent tube 54, preferably of the so-called black light or ultra-violet type which is attractive to insects. The member 52 is opaque so as not to attract other insects from the rear.

As the insects rise and are attracted to the light source 54 they must pass either through a grid 21 as previously described or through insecticide spray 46, neither of which are exemplified in FIG. 11 to simplify illustration. It will be understood that the cover 52 with the light source may be utilized with either the high voltage as shown in FIG. 3 or the insecticide spray as exemplified in FIG. 9.

The light source 54 is preferably a fluorescent tube and suitable mounting means 55 is provided therefor within the cover. Power for the source may be derived from the alternator of the tractor either directly or through an inverter if a DC generator is on the tractor. The interior of the cover member may have a reflective inner surface.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A device for exterminating insects comprising an opaque hood-like member having closed sides, a closed forward roof portion and an open button, said member being constructed and arranged to be moved by a vehicle with said open bottom a slight distance above ground growth, said member having an opening therein rearwardly from said roof portion, and insect exterminating means disposed adjacent said opening.

2. The device of claim 1 wherein said opening is covered with a transparent member.

3. The device of claim 1 further including flexible curtain-like members extending downwardly from the sides and back of said member.

4. The device of claim 3 wherein said curtain-like member are adjustable in dimension from the bottom of said member.

5. The device of claim 1 further including means depending from the front of said member for disturbing ground insects into rising into said member.

6. The device of claim 1 further including at least one pair of wheels supporting said member.

7. The device of claim 1 further including means on said member for attachment thereof to the front of a propelling vehicle.

8. The device of claim 7 further including means for adjusting the height of said member above ground level.

9. The device of claim 1 wherein said opening is covered with a transparent member adapted to admit light into said hood-like member, a light source, said light source being positioned outside of said hood-like member to radiate through said opening.

10. The device of claim 9 further including an opaque cover member supporting said light source, said cover member covering said opening.

11. The device of claim 10 wherein said cover member is detachably mounted to said hood.

12. The device of claim 1 wherein said exterminating means comprises an electrical grid disposed before said opening.

13. The device of claim 1 wherein said exterminating means comprises means carried by said hood arranged to emit a spray of insecticide across said opening.

* * * * *

PO-1050
(5/69)

UNITED STATES PATENT OFFICE
CERTIFICATE OF CORRECTION

Patent No. 3,846,932                    Dated November 12, 1974

Inventor(s) Walter Bialobrzeski

It is certified that error appears in the above-identified patent and that said Letters Patent are hereby corrected as shown below:

Column 2, line 48, "resitance" should read -- resistance --.
Column 4, line 6, after "conduit", "50" should read -- 49a --.
Column 4, line 57, "button" should read -- bottom --.
Column 5, line 2, "member" should read -- members --.

Signed and sealed this 29th day of April 1975.

(SEAL)
Attest:

RUTH C. MASON
Attesting Officer

C. MARSHALL DANN
Commissioner of Patents
and Trademarks